United States Patent
Segel

(10) Patent No.: US 7,590,055 B2
(45) Date of Patent: Sep. 15, 2009

(54) HIGH AVAILABILITY BROADBAND CONNECTIONS THROUGH SWITCHING FROM WIRELINE TO DIVERSE WIRELESS NETWORK

(75) Inventor: Jonathan Dean Segel, Kanata (CA)

(73) Assignee: Alcatel Lucent, Paris (FR)

( * ) Notice: Subject to any disclaimer, the term of this patent is extended or adjusted under 35 U.S.C. 154(b) by 843 days.

(21) Appl. No.: 10/773,226

(22) Filed: Feb. 9, 2004

(65) Prior Publication Data

US 2005/0174935 A1 Aug. 11, 2005

(51) Int. Cl.
*G01R 31/08* (2006.01)

(52) U.S. Cl. ...................................... 370/228

(58) Field of Classification Search ......... 370/225–228, 370/352–356
See application file for complete search history.

(56) References Cited

U.S. PATENT DOCUMENTS

| | | | | |
|---|---|---|---|---|
| 5,185,779 A * | 2/1993 | Dop et al. | | 379/33 |
| 5,610,951 A * | 3/1997 | Higginson et al. | | 375/364 |
| 5,936,938 A * | 8/1999 | Weldon et al. | | 370/228 |
| 6,147,966 A * | 11/2000 | Johnson et al. | | 370/221 |
| 6,498,844 B1 | 12/2002 | Stademann | | |
| 6,597,658 B1 * | 7/2003 | Simmons | | 370/221 |
| 6,598,229 B2 * | 7/2003 | Smyth et al. | | 725/107 |
| 6,714,534 B1 * | 3/2004 | Gerszberg et al. | | 370/352 |
| 6,965,775 B2 * | 11/2005 | Antoniou et al. | | 455/450 |
| 7,023,845 B1 * | 4/2006 | Simons et al. | | 370/389 |
| 2001/0043562 A1 * | 11/2001 | Hrastar et al. | | 370/227 |
| 2002/0075868 A1 * | 6/2002 | Gupta et al. | | 370/389 |
| 2002/0181479 A1 | 12/2002 | Okuno | | |
| 2002/0184376 A1 * | 12/2002 | Sternagle | | 709/230 |
| 2003/0021234 A1 * | 1/2003 | Soltysiak et al. | | 370/242 |
| 2003/0228093 A1 * | 12/2003 | Notani | | 385/24 |
| 2004/0078626 A1 * | 4/2004 | Li | | 714/4 |
| 2005/0097243 A1 * | 5/2005 | Yamashita et al. | | 710/38 |
| 2005/0152385 A1 * | 7/2005 | Cioffi | | 370/420 |
| 2006/0168336 A1 * | 7/2006 | Koyanagi et al. | | 709/240 |
| 2007/0153687 A1 * | 7/2007 | Attar et al. | | 370/229 |

FOREIGN PATENT DOCUMENTS

| | | |
|---|---|---|
| EP | 0986285 | 3/2000 |
| EP | 1009191 | 6/2000 |
| WO | WO 01/69565 | 9/2001 |

* cited by examiner

*Primary Examiner*—Kwang B Yao
*Assistant Examiner*—Tung Q Tran

(57) ABSTRACT

A broadband access connection carried over a wireline link is backed-up by a wireless connection to create a high availability communication channel. This protection system comprises a wireline link processor for connecting a user site to a provider network over a broadband access connection and a wireless link processor for connecting the user site and the provider network over a backup connection. A link monitoring mechanism supervises operation of the wireline link and generates a fault signal upon detection of a specified underperformance, failure, or overloading condition of the broadband wireline access connection. A data switching mechanism switches the user traffic received over the user interface between the wireline and the wireless link according to the fault signal. A method for protecting the wireline link is also provided.

38 Claims, 1 Drawing Sheet

HIGH AVAILABILITY BROADBAND CONNECTIONS THROUGH SWITCHING FROM WIRELINE TO DIVERSE WIRELESS NETWORK

FIELD OF THE INVENTION

The invention is directed to the field of broadband communication, and particularly to providing high availability broadband through switching to a diverse wireless network.

BACKGROUND OF THE INVENTION

The exponential growth in IP traffic and the technical advances in packet technologies have made it possible to support what was once a distinct set of parallel networks (voice, video, wireless), on one integrated data (packet based) network. This has started a move towards a common packet based network with sharing of common network infrastructure to provide services, and interoperability of these services.

The main thrust of technologies in the new packet based network is to carry multiple services of higher value over the existing infrastructure, which in the past would have supported only a single service of lower value. This is particularly true of the 'last mile' access infrastructure, where it is highly desirable to not build a separate connection to each customer to enable each new service. Today, the parallel networks tend to merge into a common data based backbone while employing multiple technologies in access (wireline, wireless, cable, satellite). In addition, there is a trend to enable packet based networks with a new set of feature-rich multimedia communication services, such as integrated messaging, multimedia conversations, on-demand multi-point conference, enhanced security & authentication, various classes of media transport services, numerous automations in electronic Internet commerce activities (banking, shopping, customer care, education, etc.).

The current wireless network consists of wireless based access and roaming capabilities that inter-operate with a wireline PSTN backbone infrastructure to provide interoperable PSTN services. As the backbone evolves towards a common packet based core network, the wireless PSTN access infrastructure also evolves to provide wireless PSTN access services while utilizing the new core network. The wireless terminals become IP enabled to allow mobility to the wireline IP based service capabilities (e.g. web browsing, e-mail etc.). In addition, new broadband wireless access emerges to provide a new set of IP enabled services.

A large set of services delivered over a shared broadband network, and in particular across DSL access, have an acceptable fit in terms of performance, availability and security. However, there is another set of services for which today's solutions for broadband delivery may not be acceptable. Examples of such services are fire alarms, burglar alarms, transaction networks (e.g. for debit and credit card transactions), data links to ATMs (Automatic Teller Machines), telemetry information for instrumentation and control system applications, and $1^{st}$ line telephony.

These services are usually specified as requiring "5 9's"; in other words, availability exceeding 99.999%. Such high availability is especially important where regulatory constraints exist about the reliability with which the respective service may be reached, such as is often the case with critical security or emergency services.

There is currently no known feasible solution for cost effectively enabling such high reliability in non-duplicated wireline access. The existent broadband delivery architectures cannot deliver the specified 'at least five 9's service availability' at a competitive cost. Attempting to achieve this level of availability purely on the wireline network would result in duplication of assets and over-engineering of large portions of the access, aggregation and core network, which would then render them too expensive to support the other services which they must carry, such as high speed Internet access.

The current solution to producing high availability networks is not just providing over-capacity (in the sense of higher capacity), but also network duplication. This means that the provider needs to install two of everything (e.g. two wireline access links) and then connect the installed duplicate devices so that any single point of failure does not take out all available capacity. This is expensive; hence a high-availability solution that uses only a single wireline connection is indeed very desirable.

Where duplicate links already exist to a customer to increase availability, these are normally configured to use all the links to the full extent possible. Existing link aggregation solutions such as Ethernet Link Aggregation per IEEE standard 802.3ad or ML PPP (Multi-Link Point to Point Protocol) per IETF RFC1717 and RFC1990 assume that where multiple functional links exist, they will all be used.

The existing standards for 'link aggregation' are not concerned with a backup wireless link where the backup is only to be employed as a last resort to maintain connectivity for the set of services mentioned above that require high availability, when the wireline link to a customer becomes unavailable.

There is a need to provide high availability broadband connections for such critical, low volume data services traditionally carried over the PSTN (Public Switched Telephone Network).

SUMMARY OF THE INVENTION

It is an object of the invention to provide high availability to critical data services in a fashion that maximizes the performance and cost effectiveness of the solution.

Accordingly, the invention is directed to a wireless protection system establishing high availability communications, comprising: a wireline link processor for connecting a user site to a provider network over a broadband access connection; a wireless link processor for connecting the user site and the provider network over a backup connection; means for monitoring operation of the wireline link and generating a fault signal upon detection of a specified under-performance condition of the broadband access connection; and means for switching user traffic received over the user interface between the wireline and the wireless link according to the fault signal.

The invention is also directed to a method for protecting a wireline access link, comprising the steps of: a) transmitting user traffic between a user site and an network provider site in a broadband access connection carried over a wireline link; b) monitoring integrity of the wireline link and generating a fault signal upon detection of a specified under-performance of the broadband access connection; and c) switching the user traffic from the broadband access connection to the backup connection according to the fault signal.

Advantageously, the invention provides a mechanism that uses a wireless backup channel to cost-effectively increase the availability of services delivered over a broadband wireline infrastructure. Because the backup wireless channel has no overhead when not in use, there is no additional overhead necessary for the data services to which the invention applies.

Also, by having traffic divert to the wireless channel only on failure of the primary wireline channel, little or no usage of the wireless channel occurs under normal conditions. This makes it possible to deploy multiple instances of the system of the invention with little bandwidth cost in the wireless network.

A further advantage of switching to the wireless channel rather than load sharing between a wireless link and wireline link is that ordering of frames or packets is preserved, which is important for some applications. In addition, ordering of packets is likely to be a problem when using wireline and wireless links together, because the wireless channel usually has higher latency (delay) than the wireline channel.

In addition, there is currently no commercially feasible solution in commonly deployed wireline broadband (e.g. DSL) architectures to provide high availability to critical, low volume data services traditionally carried over a PSTN or X.25 network. The present invention enables a carrier to offer a high availability solution for these services to their customers; sale of these services and the associated equipment will increase providers' revenues.

BRIEF DESCRIPTION OF THE DRAWINGS

The features and advantages of the invention will become more apparent from the following detailed description of the preferred embodiment(s) with reference to the attached drawing wherein.

DETAILED DESCRIPTION OF THE INVENTION

Figure 1:
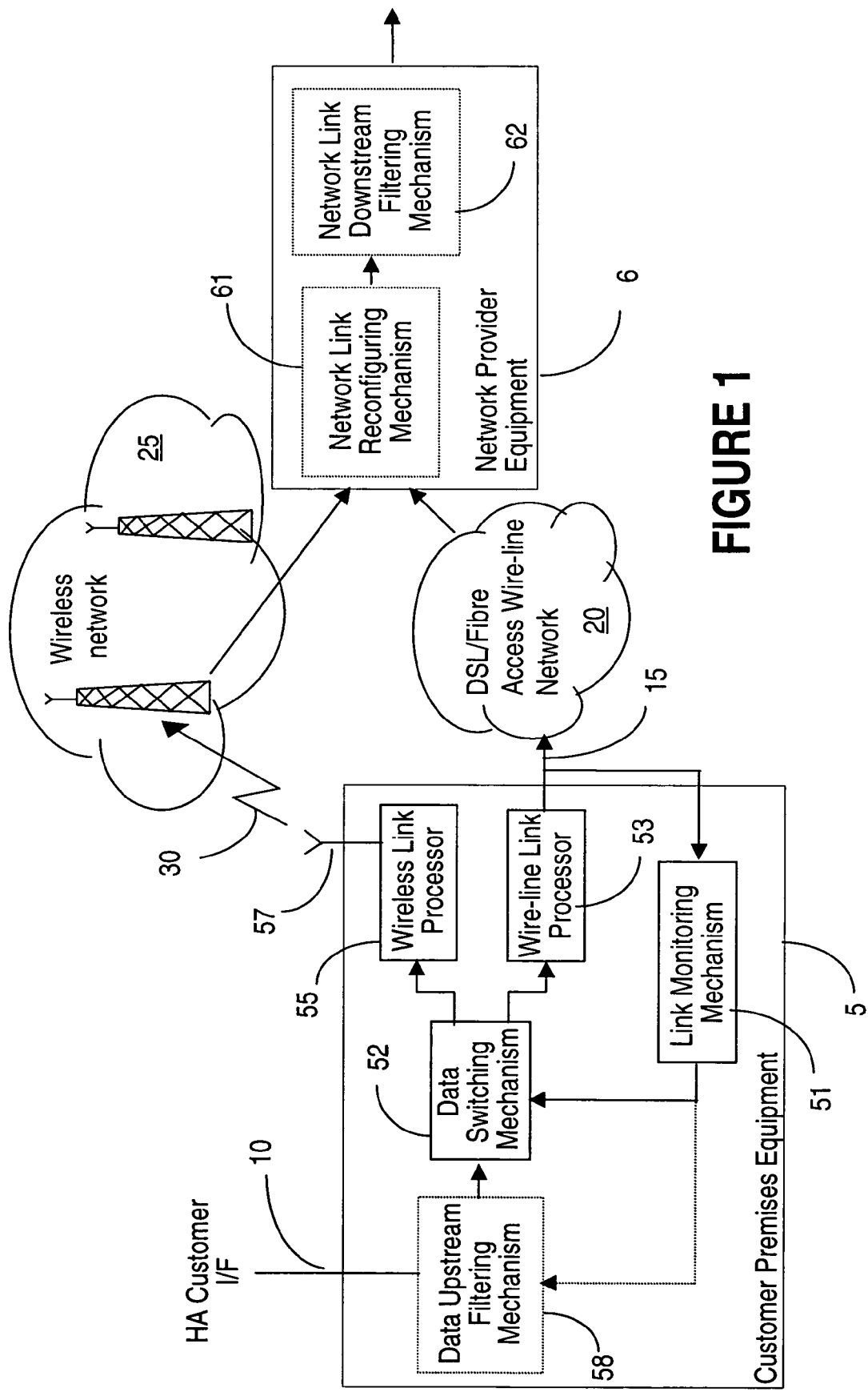
FIG. 1 illustrates a block diagram of a high availability broadband access link according to the invention.

In most countries, the mobile network is completely diverse from the wireline network except for some shared transport links, which have very high availability.

FIG. 1 is a block diagram of a high availability broadband access link, illustrating various aspects of the invention. The primary configuration is shown in full lines; optional blocks for additional functionality are shown in dotted lines.

As seen in the embodiment of FIG. 1, a customer is connected to a wireline access network 20 over customer premises equipment (CPE) illustrated at 5. The direction of the arrows in FIG. 1 shows traffic flow 'upstream' from the user to the network, although traffic will actually flow in both directions. A HA (high availability) interface between the customer and the CPE 5 is denoted with 10, and the broadband interface between the CPE 5 and the wireline network 20 is denoted with 15. A wireline channel has generally superior performance characteristics such as high throughput, low cost per bit, and low packet loss, latency (packet delay), and jitter (variability in packet delay), as compared to a wireless channel, so that the wireline link is normally set as the 'default' link.

FIG. 1 also illustrates a wireless network 25 that covers the location of CPE 5. The invention enables CPE 5 to automatically and transparently restore the broadband wireline service in the case of a failure of link 15, by establishing a wireless connection 30 through wireless network 25. At the other end of the connection, a diverse link into the destination server (not shown) ensures connectivity will not be lost in the event of almost any single point failure.

Because the data will normally traverse the wireline link 15, except under problem conditions, it normally places no load on the wireless network 30. Under failure conditions the customer node 5 automatically diverts traffic to the wireless data link. Since the wireless connection is already established through signaling, switching of traffic along the redundant wireless link is performed very fast (e.g. 50 ms).

CPE 5 includes a link monitoring mechanism (link monitor) 51 and a data switching mechanism 52. The link monitor 51 monitors the integrity of link 15 and generates a fault signal when the broadband access connection on the wireline link under-performs. Note that the fault signal is a generic term used to define the signal that triggers operation of the data switching mechanism 52 to begin transmitting data received from the customer over the wireless link 30.

The term "under-performance" as used in this specification refers to link 15 being failed, performing poorly, or being overloaded. The wireline link is for example declared "failed" when no traffic is received at the far end. This may happen for example upon detection of a loss of signal, or the failure to respond out of a period in which traffic was expected, or failure of the far-end network device to respond to an active inquiry. The wireline link is declared as "performing poorly" when the bit error rate of the received traffic is higher than a configured limit, or the packet loss is too high, or the flow of packets has excessive latency, or jitter. Still further, the wireline link is declared 'overloaded' on detection that all the available bandwidth is fully occupied, (e.g. the measured throughput is at or near wireline link capacity).

In addition, link monitor 51 monitors link 15 for detecting recovery to normal conditions. That is, it detects the conditions that allow a return to "normal" wireline transmission after diversion to the wireless link has occurred. This monitoring may be for example performed using test signals transmitted from the user site to the network at specific time intervals and the success of carrying that traffic is used to determine if switching back to the wireline link is possible. The frequency with which the wireline link is tested may be increased progressively between tests to avoid the testing from impacting on a connection which is suffering from a long duration problem. Still further, a small amount of the low priority user traffic may be used as a test signal.

As indicated above, data switching mechanism 52 switches the data path from the wireline link 15 to wireless link 30 and back, after the fault signal clears. By adding the backup wireless data link 30 to a DSL or Fibre access link 15, the customer is provided with the ability to restore connectivity for low volume and speed, critical services without over-engineering either network. This results in high availability for these critical services at low cost.

A wireline link processor 53 (a modem) performs data formatting and signalling according to the protocol used on wireline link 15. As discussed above, this could be a broadband communication link such as DSL, cable modem, or optical Ethernet transceiver, etc. Similarly, a wireless link processor 55 performs data formatting and signalling according to the protocol used on wireless link 30. Some examples of the possible technologies which could be used for the wireless link include a CDMA 1X Network, a cellular '3G' network, a 802.11 network, or a 802.16 or 'WiMax' network.

FIG. 1 shows processing of forward traffic that accesses networks 20 or 25 from CPE 5. The traffic processing for the reverse direction (from network 20 or 25 to CPE 5) is performed in a similar manner. Namely, the switch receives the traffic from one of the two links 15, or 30, as established by adequate signalling, and routes it to the customer over HA interface 10.

As noted above, the invention allows the wireless channel to be activated not just on failure of the wireline channel, but also in the situations where the wireline channel is suffering from performance impairment, such as inadequate throughput, excessive bit error rate or packet loss, or excessive delay.

The nature and number of link performance parameters that trigger the switch, as well as the level of acceptable values may be configured by the user in the link monitoring mechanism 51.

FIG. 1 is drawn showing the key decision to switch to the alternate path as being determined by the link monitoring mechanism 51 and implemented in the data switching mechanism 52. In this instance, the network link reconfiguring mechanism 61 plays no active role in switching to the alternate link. Mechanism 61 simply passively learns (eg. by Ethernet MAC bridging) which link is active. Alternatively, the network link reconfiguring mechanism 61 may determine that switching to the backup link is required, and the customer premise equipment (CPE) can be made passive. In general it is assumed that one end only will be responsible for making the switching decision to avoid the need for coordination between CPE 5 and network provider equipment (NPE) 6, although the decision making could be split between the CPE function 51 and the NPE function 61. For example, NPE 6 could make switching decisions on factors such as bit error rate or capacity loading, while CPE 5 could make switching decision based on loss of signal or latency.

In the event of failure or performance degradation, CPE 5 delivers the upstream traffic identified as high priority to the wireless link 30 in preference to other traffic types, for example in accordance with the DiffServe QoS model. Traffic prioritization is useful because the backup link 30 through the wireless network typically has lower capacity than the wireline network link 15 and also has a relatively high cost per bit. It is also common for wireless based networks to have more variable performance than is typically the case for wireline networks. It is therefore useful in most instances to have a means of identifying which traffic is most important and treating it differently. An analogous prioritization of downstream traffic is performed by the network link downstream filtering mechanism 62.

The invention provides for additional functionality, shown in dotted lines, for better controlling which traffic on a wireline link should be backed up to a wireless link of lower capacity. The identification of important traffic may be set by the customer, and may also be a function of the CPE 5 and Network Provider Equipment 6. The identification of high priority traffic may be based on one or more of the following factors: the source or destination MAC address, the 802.1q VLAN ID, the 802.1q Ethernet priority marking, the source or destination IP address, or the IP class of service identifier (eg. DiffServe Code point).

To select the high reliability traffic from the respective flow, additional data filtering mechanisms need to be employed at the customer premise and at a network provider premise, as shown in dotted line of FIG. 1 by units 58 and 62. The data filtering function is preferably provided for the forward direction in the CPE 5 between the HA interface 10 and data switching mechanism 52, and is provided for the reverse traffic (from the network to CPE 5) in the Network Link Downstream Filtering Mechanism 62 within the Network Provider Equipment NPE 6.

A further variant of the invention allows the wireless channel to be activated not just on failure or degradation of the wireline channel, but also in the situation where the wireline channel has reached maximum capacity, that is wireless becomes the 'overflow' channel and both channels 15 and 30 operate simultaneously. Link monitor 51 detects this condition based e.g. on flow rate measurement.

In this "overflow" mode, the two connections operate simultaneously. This is in contrast to the "backup" mode where the wireline network does not carry traffic when traffic is switched to the wireless link and the wireless link does not carry traffic when traffic is switched to the wireline link. The "overflow" mode", unlike existing link aggregation mechanisms such as 802.3ad and ML PPP, keeps all possible traffic on the primary wireline link, and the minimum possible traffic on the wireless link.

To deliver this overflow function, a mechanism must be implemented at both sides of the link to distribute the traffic between the two links. In the forward traffic direction (user to network), a link splitting functionality is performed by the data switching mechanism 52 and the split traffic is merged back into a single stream by the link reconfiguring mechanism 61, shown in dotted line at network provider equipment 6. For the reverse traffic (network to user), the link reconfiguring mechanism 61 splits the traffic streams for distribution along the multiple links, and the traffic is merged into as single stream again at the data switching mechanism 52 in the CPE.

If traffic filtering functions are to be performed on traffic upstream to the network which exceeds the link capacity, (i.e. to drop low priority packets or buffer traffic to keep it within the available capacity), these must be implemented within the mechanism 58. If traffic filtering functions are to be performed on traffic downstream to the customer which exceeds the link capacity, these must be implemented within the mechanism 62.

Three alternative approaches are proposed in this invention for the basic management of the parallel wireline and wireless links, i.e. for implementing the data switching mechanism 52 and network link reconfiguration mechanism 61 and link monitor 51. Only one of these approaches would be employed in any given physical implementation.

The first alternative mechanism employs OSI 'Layer 1' mechanisms. Specifically, the link monitor 51 observes activity on the wireline link 15. If a problem condition is detected, e.g. no traffic received within a defined time-out interval, or one or more traffic parameters are degrade to below an acceptable threshold, a 'Layer 1 switch' (e.g. electrical switch) occurs, diverting the physical connection to the wireless link. This mechanism is extremely inexpensive to implement, but will typically cause any session in progress to fail during the switchover. As a result, re-authentication may be required after the switchover.

The second mechanism for switching to the backup wireless link at the data switching mechanism 52 would use OSI layer 2 switching. For example, this could be implemented using an adaptation of 802.3ad Ethernet link bonding. If a problem condition is observed by the link monitor 51 on the wireline link 15, traffic is diverted to the wireless link 30, using the mechanisms defined within the 802.3ad specification. For example this could occur by rewriting the 'Operational Key' which then reassigns the MAC address of the outgoing interface in accordance with the 802.3ad standard. The network link reconfiguring mechanism 61 implements the other end of the 802.3ad link aggregation mechanism. The second diversion mechanism allows switching to the wireless link without loss of IP session continuity. The adaptation consists of link monitor 51 sensing total failure, partial failure or overloading of the wireline link and modifying the 802.3ad attributes to switch traffic to or from the wireless link. The use of the 803.3ad switching mechanism requires that both wireless and wireline link channels have an Ethernet interface. In the event that either link is not Ethernet, a Layer 3 mechanism, such as that described below will be usable instead.

The third mechanism for diversion to the backup wireless link at the data switching mechanism 52 uses OSI layer 3 and 4 protocols, for example via an adaptation of the ML-PPP (Multi-Link Point to Point Protocol) as defined in IETF RFC1990/1717. Again, ML-PPP is normally designed to make multiple links appear to be a single virtual communication channel. ML-PPP operates at OSI Layers 3 and 4 and therefore can be implemented with across any Layer 2 link type including ATM and Frame Relay. However standard ML-PPP does not allow one link to be used as 'primary' and another link as 'backup only'. This invention proposes an adaptation of this standard mechanism to force the traffic to take one path or the other based on defined criteria such as failure of a primary link as described above. This would typically be implemented as a variant of the ML-PPP software in both CPE 5 and a network based gateway 61, and use the Link Control Protocol (LCP) to signal the switch to move to one of the three states: 'wireline available/wireless unavailable' or 'wireline unavailable/wireless available', or 'both links available', as in FIG. 1.

I claim:

1. A wireless protection system for establishing high availability communications, comprising:
    a wireline link processor for connecting a user site to a network provider site over a broadband access connection;
    a wireless link processor for connecting said user site and said network provider site over a backup connection when said broadband access connection is suffering from performance impairment;
    means for monitoring operation of said wireline link and generating a fault signal upon detection of said performance impairment of said broadband access connection in dependence upon user configured threshold levels of link performance parameters;
    means for switching user traffic received over a user interface from said wireline link to said backup connection according to said fault signal;
    means for switching back said user traffic from said backup connection to said wireline link after said fault signal has been cleared;
    means for switching back said user traffic from said backup connection on said wireline link at specific intervals and determining whether said fault signal has been cleared;
    means for filtering said user traffic at said user site on receipt of said fault signal for selecting, from said user traffic, overload traffic to be carried over said backup connection; and
    means for merging said overload traffic back into said user traffic at said network provider site.

2. The system of claim 1, wherein said fault signal indicates one of a failure, performance degradation and overload of said wireline link.

3. The system of claim 2, further comprising at said user site means for filtering said user traffic on receipt of said fault signal for selecting high-priority traffic to be carried over said backup connection.

4. The system of claim 2, further comprising link filtering means at said network provider site for selecting high-priority traffic to be carried to said user site over said backup connection on receipt of said fault signal.

5. The system of claim 2, further comprising:
    means for filtering said user traffic at said user site on receipt of said fault signal for selecting from said user traffic, said high priority traffic to be transmitted over said backup connection; and
    network link filtering means for filtering said user traffic at said network provider site for selecting high-priority traffic to be carried to said user site over said backup connection on receipt of said fault signal.

6. The system of claim 1, wherein said fault signal indicates an overload of said wireline link.

7. The system of claim 6, further comprising:
    network link filtering means for filtering said user traffic at said network provider site on receipt of said fault signal for selecting said overload traffic; and
    a network provider reconfiguring mechanism for separating said overload traffic from said user traffic and routing said overload traffic to said user site over said backup connection.

8. The system of claim 1, wherein said means for switching is a data packet switch for communicatively coupling said user interface to one of said wireless link processor and said wireline link processor under control of said means for monitoring.

9. The system of claim 1, wherein said means for switching is one of a router and an OSI layer 3 switch.

10. The system of claim 1, wherein said means for switching is an OSI layer 2 Ethernet switch.

11. The system of claim 1, wherein said means for switching is a physical layer media switch.

12. A method for protecting a wireline access link, comprising the steps of:
    transmitting user traffic between a user site and a network provider site in a broadband access connection carried over said wireline link;
    transmitting user traffic between said user site and said network provider site over a backup connection carried over a wireless link when said broadband access connection is suffering from performance impairment;
    monitoring integrity of said wireline link and generating a fault signal upon detection of said performance impairment of said broadband access connection in dependence upon user configured threshold levels of link performance parameters;
    switching said user traffic from said broadband access connection to a backup connection according to said fault signal;
    filtering said user traffic at said user site on receipt of said fault signal for selecting, from said user traffic, overload traffic to be carried over said backup connection; and
    merging said overload traffic back into said user traffic at said network provider site;
    wherein said fault signal is generated in response to a degraded performance detected on said wireline link and said degraded performance may be any impairment selected from the group consisting of inadequate throughput, excessive bit error rate, excessive packet loss, excessive latency, and excessive jitter.

13. A method for protecting a wireline access link, comprising the steps of:
    transmitting user traffic between a user site and a network provider site in a broadband access connection carried over said wireline link;
    monitoring integrity of said wireline link and generating a fault signal upon detection of said performance impairment of said broadband access connection in dependence upon user configured threshold levels of link performance parameters;
    switching said user traffic from said broadband access connection to a backup connection according to said fault signal; and
    switching back said user traffic from said backup connection to said broadband access connection once said fault signal has been cleared;

filtering said user traffic at said user site on receipt of said fault signal for selecting, from said user traffic, overload traffic to be carried over said backup connection; and merging said overload traffic back into said user traffic at said network provider site.

14. The method of claim 12, wherein said fault signal indicates one of a failure, performance degradation and overload of said wireline link.

15. The method of claim 14, further comprising filtering said user traffic on receipt of said fault signal for selecting high-priority traffic to be carried over said backup connection.

16. A method for protecting a wireline access link, comprising the steps of:

transmitting user traffic between a user site and a network provider site in a broadband access connection carried over said wireline link;

transmitting user traffic between said user site and said network provider site over a wireless link when said broadband access connection is suffering from performance impairment;

monitoring integrity of said wireline link and generating a fault signal upon detection of said performance impairment of said broadband access connection in dependence upon user configured threshold levels of link performance parameters;

switching said user traffic from said broadband access connection to said wireless link according to said fault signal, and adapting said user traffic to a capacity of said wireless link by discarding low priority data from said user traffic; and filtering said user traffic at said user site on receipt of said fault signal for selecting, from said user traffic, overload traffic to be carried over said backup connection; and merging said overload traffic back into said user traffic at said network provider site.

17. The method of claim 16, wherein said step of adapting said user traffic to a capacity of said wireless link comprises buffering low priority data from said user traffic.

18. The method of claim 14, further comprising filtering said user traffic at said network provider on receipt of said fault signal for selecting high-priority traffic to be carried to said user site over said backup connection.

19. The method of claim 14, wherein said step of filtering comprises one of discarding and buffering low priority data from said user traffic.

20. The method of claim 14, further comprising:

filtering said user traffic at said user site on receipt of said fault signal for selecting from said user traffic, high-priority traffic to be transmitted over said backup connection; and filtering said user traffic at said network provider site on receipt of said fault signal for selecting high-priority traffic to be carried to said user site over said backup connection.

21. The method of claim 12, wherein said fault signal indicates an overload condition of said wireline link.

22. The method of claim 18, wherein an overload condition is recognized based on a measured throughput near wireline link capacity.

23. The method of claim 21, further comprising, at said network provider site: filtering said user traffic on receipt of said fault signal for selecting said overload traffic; and routing said overload traffic to said user site over said backup connection.

24. The method of claim 12, wherein said fault signal is generated based on signaling of link configuration or availability using the 802.3ad Ethernet link aggregation protocol.

25. The method of claim 12, wherein said step of switching said user traffic from said broadband access connection to a backup connection according to said fault signal is based on signaling of link configuration or availability within the IETF RFC 1717/RFC 1990 Multi-link Point to Point protocol.

26. The method of claim 12, wherein said fault signal is generated based on detection of absence of a signal within a time-out interval, or a failure to respond to an active health test condition.

27. The method of claim 12, further comprising maintaining said wireline link always available for traffic.

28. The method of claim 16, further comprising maintaining said wireline link unavailable when traffic is switched over said wireless link.

29. The method of claim 28, further comprising maintaining said wireless line link unavailable when traffic is switched over said wireline link.

30. The method of claim 13, wherein said step of switching back said user traffic from said backup connection to said broadband access connection once said fault signal has been cleared comprises transmitting test data over said wireline link to determine recovery of said broadband access connection.

31. The method of claim 30, wherein said test data comprises one of low-priority user traffic and test probes.

32. The method of claim 13, wherein said specific intervals increase progressively to reduce the impact of testing on traffic performance.

33. The method of claim 15, wherein said high priority traffic is selected by means of policing or shaping low priority traffic at said user site when traffic presented exceeds the available upstream link capacity.

34. The method of claim 15, wherein said high priority traffic is selected by means of policing or shaping low priority traffic at said network provider site when traffic presented exceeds the available upstream link capacity.

35. The system of claim 1, wherein said performance impairment is any impairment selected from the group consisting of inadequate throughput, excessive bit error rate, excessive packet loss, excessive delay, and excessive jitter.

36. The method of claim 13, wherein said performance impairment is any impairment selected from the group consisting of inadequate throughput, excessive bit error rate, excessive packet loss, excessive delay, and excessive jitter.

37. The method of claim 16, wherein said performance impairment is any impairment selected from the group consisting of inadequate throughput, excessive bit error rate, excessive packet loss, excessive delay, and excessive jitter.

38. The method of claim 16, wherein said step of adapting said user traffic to a capacity of said wireless link comprises identification of high priority data based on at least one criterion selected from the group consisting of: a source MAC address, a destination MAC address, an 802.1q VLAIN ID, an 802.1q Ethernet priority marking, a source IP address, a destination IP address, and an IP class of service identifier.

* * * * *

UNITED STATES PATENT AND TRADEMARK OFFICE
CERTIFICATE OF CORRECTION

| | | |
|---|---|---|
| PATENT NO. | : 7,590,055 B2 | Page 1 of 1 |
| APPLICATION NO. | : 10/773226 | |
| DATED | : September 15, 2009 | |
| INVENTOR(S) | : Segel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,275 days.

Signed and Sealed this
Third Day of May, 2011

David J. Kappos
*Director of the United States Patent and Trademark Office*